United States Patent
Godefroid

(10) Patent No.: US 9,552,285 B2
(45) Date of Patent: Jan. 24, 2017

(54) MICRO-EXECUTION FOR SOFTWARE TESTING

(71) Applicant: Microsoft Technology Licensing, LLC, Redmond, WA (US)

(72) Inventor: Patrice Godefroid, Mercer Island, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 188 days.

(21) Appl. No.: 13/875,396

(22) Filed: May 2, 2013

(65) Prior Publication Data

US 2014/0331204 A1    Nov. 6, 2014

(51) Int. Cl.
G06F 9/44 (2006.01)
G06F 11/36 (2006.01)
G06F 21/57 (2013.01)
G06F 9/445 (2006.01)
G06F 11/34 (2006.01)

(52) U.S. Cl.
CPC ....... G06F 11/3688 (2013.01); G06F 11/3624 (2013.01); G06F 11/3636 (2013.01); G06F 21/577 (2013.01); G06F 9/44589 (2013.01); G06F 11/3466 (2013.01); G06F 11/3664 (2013.01); G06F 11/3684 (2013.01)

(58) Field of Classification Search
CPC .............. G06F 11/3664; G06F 11/3684; G06F 11/3688; G06F 9/44589; G06F 11/3466; G06F 2201/865; G06F 11/3636
See application file for complete search history.

(56) References Cited

U.S. PATENT DOCUMENTS

| 5,832,271 | A | 11/1998 | Devanbu |
| 7,069,470 | B2 * | 6/2006 | Wilding ................ G06F 11/366 712/244 |
| 7,721,175 | B2 * | 5/2010 | Resnick ........................ 714/733 |
| 7,975,257 | B2 | 7/2011 | Fanning et al. |
| 8,219,987 | B1 | 7/2012 | Vlaovic et al. |
| 8,286,149 | B2 | 10/2012 | Dor et al. |
| 8,296,741 | B1 | 10/2012 | Huang et al. |

(Continued)

OTHER PUBLICATIONS

Godefroid et al., "DART: Directed Automated Random Testing", 2005 ACM, PLDI'05, Jun. 12-15, 2005, Chicago, Illinois, USA, pp. 213-223; <http://dl.acm.org/results.cfm?h=1&cfid=557461532&cftoken=41619629>.*

(Continued)

Primary Examiner — Thuy Dao
Assistant Examiner — Ben C Wang
(74) Attorney, Agent, or Firm — Alin Corie; Sandy Swain; Micky Minhas

(57) ABSTRACT

Micro-execution is the ability to run any code segment in isolation. Implementations for micro-execution of code segments are described. A test engine determines an effective address of a memory operation of an instruction of an executable program. The test engine determines, prior to performing the memory operation and based on a memory policy, that the effective address is to be replaced with a replacement address. Based on determining that the effective address is to be replaced, the test engine allocates the replacement address and executes the instruction based on the allocated replacement address.

20 Claims, 4 Drawing Sheets

(56) References Cited

U.S. PATENT DOCUMENTS

| | | | | |
|---|---|---|---|---|
| 8,806,450 | B1* | 8/2014 | Maharana | G06F 11/3688 717/133 |
| 8,854,908 | B1* | 10/2014 | Burstein et al. | 365/201 |
| 2003/0204778 | A1* | 10/2003 | Wilding | G06F 11/366 714/19 |
| 2004/0024999 | A1* | 2/2004 | Chauvel et al. | 712/245 |
| 2007/0079288 | A1* | 4/2007 | Willwerth et al. | 717/124 |
| 2008/0270996 | A1* | 10/2008 | Choi | G06F 11/3664 717/129 |
| 2009/0265692 | A1* | 10/2009 | Godefroid et al. | 717/128 |
| 2010/0146220 | A1* | 6/2010 | Panchenko et al. | 711/154 |
| 2010/0153689 | A1* | 6/2010 | Choquette et al. | 712/207 |
| 2010/0153924 | A1* | 6/2010 | Andrews | G06F 11/3688 717/126 |
| 2010/0192026 | A1* | 7/2010 | Abadi et al. | 714/53 |
| 2010/0257511 | A1* | 10/2010 | Hatabu | G06F 11/3636 717/131 |
| 2010/0280817 | A1* | 11/2010 | Unseld | 703/21 |
| 2010/0299658 | A1 | 11/2010 | Ng et al. | |
| 2011/0061050 | A1* | 3/2011 | Sahita | G06F 9/45533 718/1 |
| 2011/0276948 | A1 | 11/2011 | Tripp | |
| 2011/0296245 | A1* | 12/2011 | Alberi | G06F 11/3664 714/38.1 |
| 2011/0321001 | A1 | 12/2011 | Dutta et al. | |
| 2012/0084759 | A1* | 4/2012 | Candea | G06F 11/3612 717/126 |
| 2012/0311128 | A1* | 12/2012 | Pechanec | G06F 11/3414 709/224 |
| 2013/0097586 | A1* | 4/2013 | Chandra | G06F 11/3684 717/124 |
| 2014/0033179 | A1* | 1/2014 | Gustus | G06F 11/3664 717/127 |
| 2014/0237299 | A1* | 8/2014 | Nachimuthu | G06F 11/0772 714/42 |
| 2015/0254170 | A1* | 9/2015 | Gillaspie | G06F 11/3684 714/38.1 |
| 2016/0224455 | A1* | 8/2016 | Sekiguchi | G06F 11/3612 |
| 2016/0239407 | A1* | 8/2016 | Ivancic | G06F 11/3684 |

OTHER PUBLICATIONS

Patrice Godefroid, "Micro Execution", ACM, ICSE'14, May 31-Jun. 7, 2014, Hyderabad, India, pp. 539-549; <http://dl.acm.org/citation.cfm?id=2568273&CFID=838883207&CFTOKEN=42896121>.*

Patrice Godefroid, "Micro Execution", ICSE'14, Jun. 2014, Hyderabad, India, pp. 1-17; <http://research.microsoft.com/en-us/um/people/pg/public_psfiles/talk-icse2014.pdf>.*

Cadar et al., "Symbolic execution for software testing in practice-preliminary assessment", May 2011, IEEE, ICSE'11, Waikiki, Honolulu, HI, USA, pp. 1066-1071; <http://ieeexplore.ieee.org/stamp/stamp.jsp?tp=&arnumber=6606558>.*

"Code Contracts", Miscosoft Research, retrieved on Apr. 29, 2013 at http://research.microsoft.com/en-us/projects/contracts/, 4 pages.

"Junit, A programmer-oriented testing framework for Java", retrieved on Apr. 29, 2013 at http://junit.org/, 1 page.

"Pex and Moles—Isolation and White box Unit Testing for .NET", retrieved on Apr. 29, 2013 at http://research.microsoft.com/en-us/projects/pex/, 4 pages.

Berkowits et al., "Pin—A Dynamic Binary Instrumentation Tool", Intel Developer Zone, published on Jun. 13, 2012, 3 pages.

Bhansali et al., "Framework for Instruction-level Tracing and Analysis of Programs Executions", Second International Conference on Virtual Execution Environments, Mar. 22, 2006, 10 pages.

Bush et al., "A static analyzer for finding dynamic programming errors", Software—Practice and Experience, accepted Dec. 28, 1999, 28 pages.

Colby et al., "Automatically Closing Open Reactive Programs," Proceedings of 1998 ACM SIGPLAN Conference on Programming Language Design and Implementation, Jun. 1998, 14 pages.

Das et al., "ESP: Path-Sensitive Program Verification in Polynomial Time", PLDI'02, Jun. 17-19, 2002, 12 pages.

Fahndrich et al., "Embedded Contract Languages", SAC'10, Mar. 22-26, 2010, 8 pages.

G. J. Myers, "The Art of Software Testing", published by John Wiley & Sons, Inc., second edition, publication date Jun. 21, 2004, 151 pages.

Godefroid et al., "SAGE: Whitebox Fuzzing for Security Testing", In Proceedings of Communications of the ACM, vol. 55, No. 3, Published Date: Mar. 2012, 5 pages.

Gunter et al., "Path Exploration Tool", Proceedings of 5th Conference on Tools and Algorithms for the Construction and Analysis of Systems, 1999, 11 pages.

Hallem et al., "A System and Language for Building System-Specific Static Analyses", PLDI'02, Jun. 17-19, 2002, 14 pages.

Holler et al., "Fuzzing with Code Fragments", In Proceedings of 21st USENIX Security Symposium, Published Date: Aug. 8, 2012, 14 pages.

Kolbitsch et al., "Rozzle: De-Cloaking Internet Malware", Microsoft Research Technical Report, Aug. 5, 2011, 20 pages.

P. Godefroid, "Compositional Dynamic Test Generation", POPl'07, Jan. 17-19, 2007, 8 pages.

Tillmann et al., "Parameterized Unit Tests", ESEC-FSE'05, Sep. 5-9, 2005, 10 pages.

Tillmann et al., "Pex—White Box Test Generation for .NET", Microsoft Research, Apr. 2008, 20 pages.

* cited by examiner

MICRO-EXECUTION FOR SOFTWARE TESTING

BACKGROUND

A code segment of a large, legacy program is written by a programmer with the expectation that another portion of the program (i.e., one or more other code segments) will have established a relevant execution state for the execution of the code segment, including the inputs and addresses referenced by the instructions of the code segment. It is often useful to test a code segment of a larger program, but testing a code segment in isolation involves establishing an execution state; otherwise the code segment's output is likely to be uninteresting or cause a system crash.

Various tools have been developed to assist in the testing of code fragments or segments. For example, in order to execute and test software segments in isolation (e.g., "unit testing"), a test harness can be written to isolate the component from the other components of the program. A test harness includes code and data that emulates the larger executable environment in which the code segment is designed to operate. But manual test harness programming is time-consuming and expensive. In automatic test-harness generation, the code segment is statically analyzed in order to test its input/output interface and test harness inputs are automatically generated for the detected interface. Automatic test harness generation often requires user guidance and results in imprecise tests, and has therefore not been widely implemented.

Within object-oriented programming, mock objects for unit testing simulate the behavior of other objects that are impractical to include within the testing environment. Frameworks for mock object creation and unit testing are not automatic and require user set-up. These are implemented only for object-oriented languages, and not for legacy code, such as code written in C, C++, etc., or for large systems.

BRIEF SUMMARY

This Summary is provided in order to introduce simplified concepts of the present disclosure, which are further described below in the Detailed Description. This summary is not intended to identify essential features of the claimed subject matter, nor is it intended for use in determining the scope of the claimed subject matter.

Embodiments of the present disclosure describe micro-execution of code segments without the use of a test harness or other test code developed specifically for the code segment. As used herein, micro-execution is the ability to run any code segment in isolation and without test code or data. Micro-execution, which may be implemented as a virtual machine, decomposes instructions, traps any memory operations within the instruction, and calculates effective addresses of the memory operations. Micro-execution determines, based on a memory policy, whether memory operations of a code segment under test are input or output operations and allocates replacement addresses for the input and output operations. Micro-execution then generates input values for any input operations according to the memory policy, and executes the instruction utilizing the replacement addresses and/or the input values generated according to the memory policy. For some implementations—such as for example packet parser testing, targeted fuzzing, and malware detection—micro-execution enables relatively fast and efficient testing to discover bugs, security vulnerabilities, and malicious software.

BRIEF DESCRIPTION OF THE DRAWINGS

The Detailed Description is set forth with reference to the accompanying figures. In the figures, the left-most digit(s) of a reference number identifies the figure in which the reference number first appears. The use of the same reference numbers in different figures indicates similar or identical items.

DETAILED DESCRIPTION

Overview

Embodiments include methods and systems to test code segments without having to set up a test harness or other mechanism to establish a program state. During test execution of a code segment, memory operations are trapped and a memory policy is utilized to dynamically provide test inputs to a code segment under test. In various embodiments, a micro-execution test engine, which may be a modified runtime virtual machine, performs "micro-execution" of code segments, and utilizes a memory policy to provide test inputs. As used herein, micro-execution is the ability to run any code fragment of an executable program, such as a standard executable (e.g., an .exe file), a dynamic link library (DLL), and an application programming interface (API), using the memory policy to determine the inputs and outputs of the code segment, and using the memory policy to dynamically determine the inputs. In various embodiments, source code is not tested; instead the executable code is tested.

As noted above, a code segment is written with the expectation that other components of the executable program will have provided a relevant state for the execution of the code segment. To provide inputs without the use of a test harness, mock objects, or other test code, embodiments of the present disclosure trap the memory operations of the code segment and, prior to performance of a memory operation, utilize a memory policy to determine whether to allocate replacement memory and/or to provide test input for the memory operation. The execution of the instruction associated with the trapped memory operation is performed using the allocated address and/or the test input. With a properly defined memory policy for a code segment under test, the code segment can be tested quickly and easily, without having to program a test harness, mock object, or other testing code.

The processes, systems, and devices described herein may be implemented in a number of ways. Example implementations are provided below with reference to the following figures.

Example Environment

Figure 1:
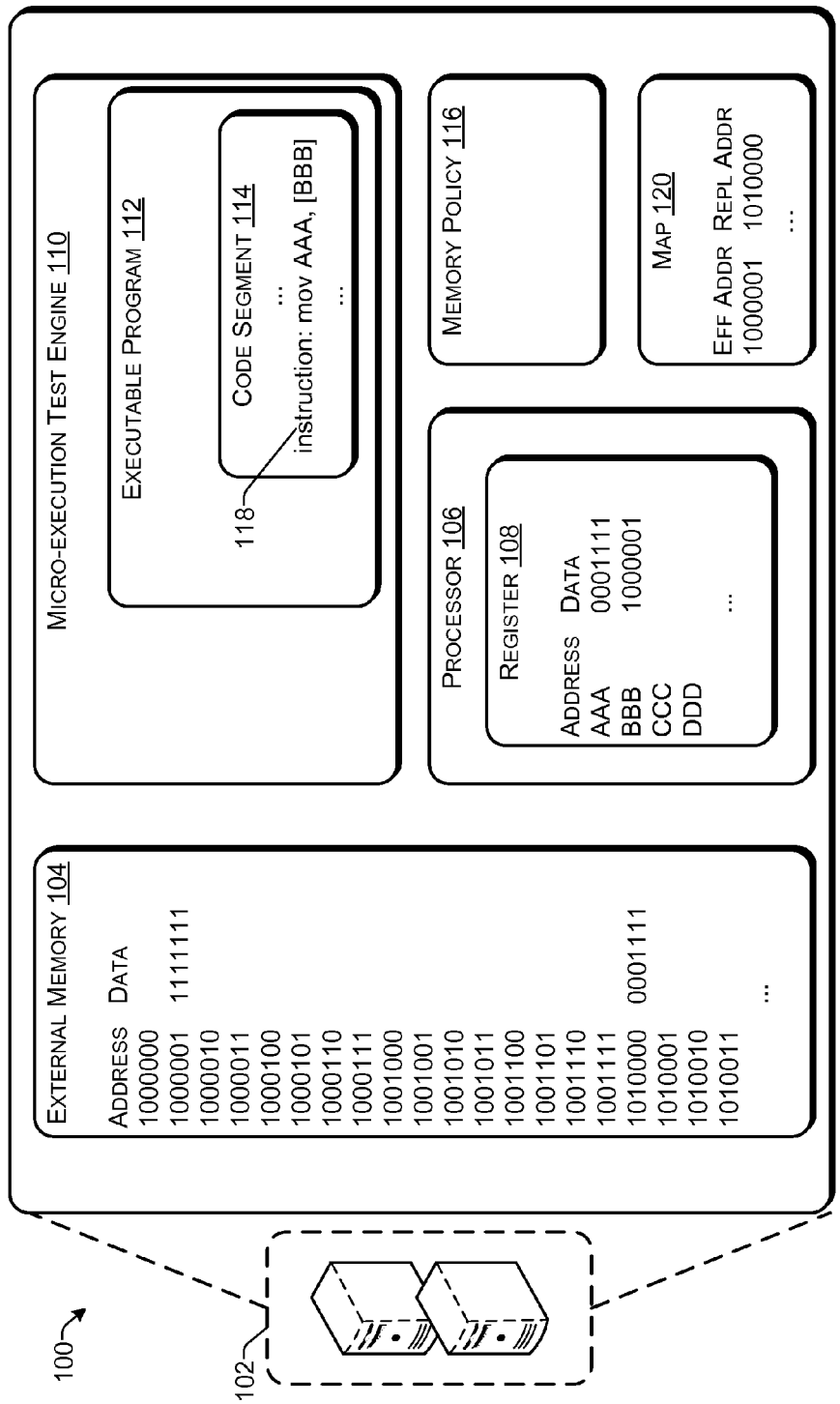
FIG. 1 is a block diagram of an example environment for micro-execution of a code segment.

FIG. 1 is a block diagram of an example environment 100 for micro-execution of a code segment. Computing system 102 includes external memory 104, and a processor 106. The external memory 104 includes data stored at various addresses of the external memory 104. The processor 106 includes a register 108, which includes various register addresses. A micro-execution test engine 110 is executed by the processor 106, and is particularly configured to test code segments of the executable program 112, such as the code segment 114. The micro-execution test engine 110 may be a modified runtime virtual machine that executes or simulates the execution of the code segment 114.

An entry point designating the start of the code segment 114 under test is received by the micro-execution test engine 110, and the micro-execution test engine 110 begins executing the code segment 114. The micro-execution test engine 110 decomposes each processor instruction into micro instructions (where each micro instruction includes no more than one memory operation), traps the micro instructions that include memory operations, and breaks apart the memory operations into micro-operations, as will be described in more detail below. The micro-execution test engine 110 refers to a memory policy 116 that defines which memory operations are inputs to the code segment, which memory operations are outputs to the code segment, and which memory operations are neither inputs nor outputs to the code segment. Where the micro-execution test engine 110 determines that a memory operation is either an input or an output, the micro-execution test engine 110 allocates a replacement address of the external memory 104 for the memory operation. Where the micro-execution test engine 110 determines that the memory operation is an input to the memory operation, the micro-execution test engine 110 also utilizes the memory policy 116 to generate an input value for the memory operation, and stores the input value at the allocated replacement address. The memory operation and the micro instruction are then performed using the allocated replacement address and/or the generated input value.

An example of a memory policy definition for an input is "any value read from an uninitialized function argument, plus any dereference to a previous input." Under this example memory policy definition (others are possible), any address (dereference) to a previous input is an input. And any uninitialized function argument is an input. Under this definition of an input, a global variable is not an input.

Upon trapping a memory operation of a micro instruction of the code segment 114 under test, a micro-execution test engine 110 calculates an effective address of the memory operation. The effective address is a memory address of the external memory 104 where the code segment 114 expects the input or the output value to be stored.

Referring to the example shown in FIG. 1, the instruction 118 of the code segment 114 is "mov AAA, [BBB]". This instruction means to (1) use the value of register BBB as a 32-bit address, (2) get the 32-bit value located at that address (denoted [BBB]), and then (3) store that 32-bit value in register AAA. Thus, the effective address for this memory operation is the value of register BBB, which is 1000001, where value 1111111 is stored. The value 1111111 is an input to the execution. During normal execution of the instruction 118, the value 1111111 would be moved to register AAA. But because code segment 114 is being tested in isolation using micro-execution, the micro-execution test engine 110 allocates a replacement address and determines a value for the input, which are then substituted when executing the trapped memory operation, as is described in more detail below.

After the effective address is calculated, the micro-execution test engine 110 determines whether the memory operation is an input or output, such as based on the memory policy 116. If the memory operation is an input or output, then the micro-execution test engine 110 allocates a replacement address for the memory operation.

In the example shown in FIG. 1, the replacement address for effective address 1000001 is 1010000. A map 120 is generated and maintained by the micro-execution test engine 110 in order to map the effective addresses to the replacement addresses for the memory operations of the code segment 114 under test.

Where the memory operation is an input, the micro-execution test engine 110 utilizes the memory policy 116 to determine a value to be generated for the input memory operation. Examples of value determination policies of the memory policy 116 include that the test input value is randomly generated; that the test input value is zero; that the test input value is read from a file, that the test input value is provided by another tool, or other. Other value determination policies are possible, and may be user-defined.

In the example shown in FIG. 1, the micro-execution test engine 110 provides a value (0001111) for the memory operation and stores the provided value at the replacement address (1010000) in the external memory 104. Once the input value is generated according to the memory policy 116, the micro-execution test engine 110 executes the instruction utilizing the replacement memory and/or the value generated for the memory operation by the micro-execution test engine 110 according to the memory policy 116. In the example shown in FIG. 1, the micro-execution test engine 110 executes the instruction "mov AAA, [BBB]" by substituting the value of the replacement address (1010000) for the value of the address stored in register BBB (1000001), with the result being that execution of the instruction causes the contents of replacement address 1010000 (value=0001111) to be stored into register AAA.

Where the memory operation is an output, the replacement address is allocated for the output memory operation, and the micro-execution test engine 110 executes using the memory operation and the instruction using the allocated replacement address, which results in storing the output value generated by the instruction at the allocated replacement address.

Example of Instruction Decomposition

Referring again to the example instruction 118 in FIG. 1, the micro-execution test engine 110 decomposes the instruction: "mov AAA, [BBB]" into the following example micro instructions:

GenerateEffectiveAddress
PREMemoryAccessCallBack
mov AAA, [EffectiveAddress]

GenerateEffectiveAddress is a macro which computes the address (if any) that is accessed by the current instruction. During micro-execution of the code segment 114, the computed address is stored at a memory location or register named EffectiveAddress.

Then, PREMemoryAccessCallBack is a micro-execution test engine 110 call back that occurs after EffectiveAddress is computed but before [EffectiveAddress] (i.e., the value stored at the Effective Address) is accessed. This call back looks up the memory policy 116 to determine whether the EffectiveAddress should either be untouched or replaced by a new address (e.g., whether the memory operation is an input/output operation or neither). For instance, with the example memory policy 116 described above, all in or out parameters of the user top-level function are to be replaced, and the micro-execution test engine 110 automatically allocates memory for those parameters in the external memory 104. The micro-execution test engine 110 also generates and maintains the map 120, which maps effective addresses to allocated replacement addresses in the external memory 104. When the memory operation is an input/output operation, the value of EffectiveAddress is replaced by a corresponding replacement address in the external memory. The code segment 114 under test is not aware that the effective address is replaced with a replacement address.

The code segment 114 under test execution is not aware of the replacement of the external memory 104. Specifically, in the example illustrated in FIG. 1, the value of register BBB is not modified to contain the value of an address in the external memory 104. It is important to hide the existence of the external memory 104 in order not to corrupt in any way the behaviors of the code segment 114 being executed.

Next, the "mov AAA, [EffectiveAddress] is performed, replacing the [BBB] pointer with the [EffectiveAddress] pointer, in order to simulate the execution of that instruction using an input value generated by the memory policy 116, rather than using the input value stored at the memory address stored in register BBB. (Note that even the value of all the processor flags, such as the EFLAGS on an x86 processor architecture, is preserved so this simulation is perfect, i.e., performed at the bit-level.)

Example Memory Policies

The input values can be generated using different user-controlled strategies or by using other test generation tools, as designated by the memory policy 116. Various example strategies include zero mode, where all input values are zeros. Another example strategy includes random mode, where all input values are randomly generated (or pseudo-randomly generated). In random mode, address values are not completely random (for instance, they do not overlap with reserved system addresses). Thus, where random mode is being used to generate values, memory addresses are instead generated by calling a memory allocation function, such as malloc( ) or other function. Another example strategy is file mode, where inputs are read from a file, are user-generated, or are generated by another tool.

Different input modes defined by the memory policy 116 may trigger different program behaviors. For instance, some input modes may generate the same input address more than once, while other input modes may not, simulating different memory "aliasing" strategies, which in turn may trigger different behaviors in the presence of pointer arithmetic in the code being micro-executed.

In general, where the inputs to a code segment are unconstrained (the inputs expected by the code segment could be virtually any value), then the memory policy can utilize an unconstrained input value generation strategy. But where the inputs to a code segment under test are constrained by design (e.g., the inputs to the code segment are from a limited set), then testing the program without constraining the inputs may trigger behaviors and crashes that would not occur in actual operation, and are therefore not interesting to the tester. In such cases, a memory policy to establish appropriately constrained inputs is useful. A user, test driver, whole program analysis tool, or other may be used to determine an input generation strategy that determines whether the inputs are to be constrained, and/or to determine what the constrained set of inputs will be.

On the other hand, micro-execution may miss bugs if the input set is too small, or if the memory policy is too loose (i.e., if the testing is able to recover from memory corruptions that could legitimately happen in a realistic environment). For example, if p can be NULL in some calling context for the function foo( ) below, *p (pointer to p) will crash in real-life, but not during micro-execution (if using a memory policy that matches NULL to some other address in the external memory).

```
int foo(char *p) { // p is a 4-bytes input
    char v = *p;    // *p is a 1-byte input
    return atoi(v);
}
```

In order to improve code coverage, the input values fed to the executable program under test by micro-execution can be generated by other tools specialized for test generation, such as dynamic test-generation tools.

Example Testing Applications

There are many possible applications for micro-execution. Three examples are parser isolation, malware detection, and targeted fuzzing. These three applications do not suffer from the issues identified above with respect to selecting a memory policy value generation strategy. This is because the "unit" (code fragment) is defined in each example testing application to have no precondition (e.g., the inputs are not constrained) and the three example testing applications have memory policies that precisely define the set of possible inputs.

Packet parsers—code that parses networking packets—may include bugs that could be exploited to compromise the security of a computing system. Micro-execution of a packet parser, such as in an operating system or other packet parser code, enables quick testing of code that is otherwise difficult to thoroughly test.

Malware—including malware that may be hidden in third party applications (including third party applications submitted to a mobile application store)—is added to seemingly benign software by malicious parties so that when the software is executed, the computing system executing the malware can reveal sensitive data (such as location, personally identifying information, etc.), make the computing system available to be taken over by another computing system, or perform some other malicious function. The malware developer will typically take steps to obfuscate the malware, so that the malware does not easily reveal itself during testing. For example, the malware may be nested in a series of "if" statements within the code. Simply loading the application and monitoring what it does is often not sufficient to identify the presence of malware on a third-party application. Instead, the malware may not perform its malicious function—such as sending a packet to a site on the Internet that is not expected given the context of the application—until the user enters some information, or performs some series of tasks within the software application. In other words, the malware may look for some typical user behavior pattern before performing the malicious function. Embodiments perform micro-execution of code segments of third party applications, using a random-mode input generation strategy, in order to test for malicious functions within the software. Any unexpected behavior, such as sending an unexpected packet to an Internet location, would indicate that there is malware in the application.

Targeted fuzzing is a testing strategy that micro-executes code segments identified as "hot spots." For example, input file parsers may be a source of bugs or vulnerabilities within an application. To test an input file parser using micro-execution, an application state of the executable is generated by executing the executable up to a point that an untrusted input file is parsed. At the point where the input file has begun to be parsed, the state is saved in a file and the parser code segment is micro-executed using a memory policy to read inputs from the saved state file. The execution state may be first altered or "fuzzed" before micro-execution in order to test variations on the code state. By using the state of the program execution, with small changes made therein, the micro-execution of the code segment can more quickly determine whether there are software bugs in the code segment compared with conventional testing methodologies applied to the entire program.

Example Computing Device for Micro-Execution

Figure 2:
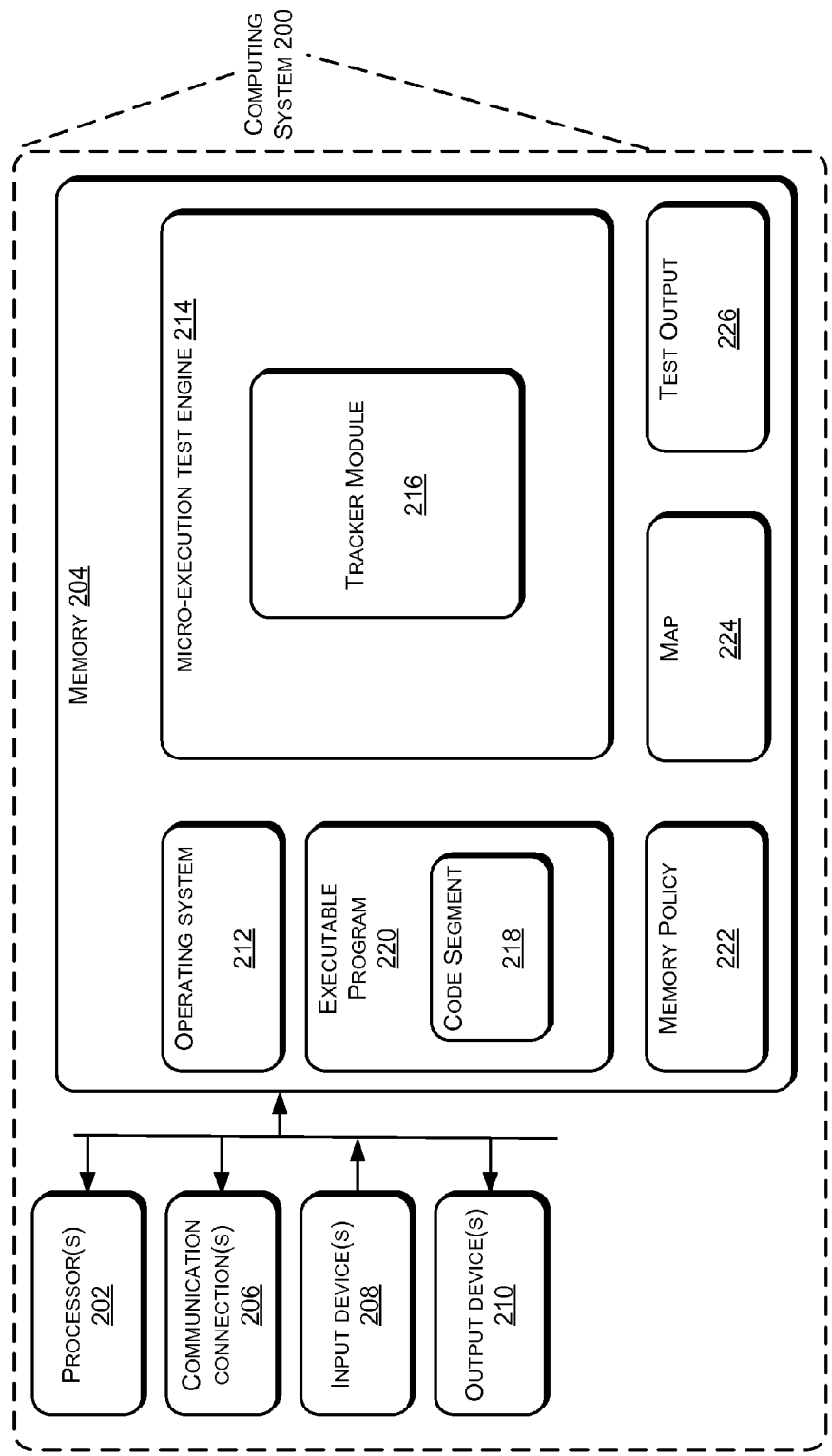
FIG. 2 is a block diagram of an example computing system usable to perform micro-execution of code segments.

FIG. 2 is a block diagram of an example computing system 200 usable to perform micro-execution of code segments. The computing system 200 may be configured as any suitable computing device capable of implementing all or part of a micro-execution environment. According to various non-limiting examples, suitable computing devices may include personal computers (PCs), servers, server farms, datacenters, special purpose computers, tablet computers, game consoles, smartphones, combinations of these, or any other computing device(s) capable of storing and executing all or part of a micro-execution test environment In one example configuration, the computing system 200 comprises one or more processors 202 and memory 204. The computing system 200 may also contain communication connection(s) 206 that allow communications with various other systems. The computing system 200 may also include one or more input devices 208, such as a keyboard, mouse, pen, voice input device, touch input device, etc., and one or more output devices 210, such as a display, speakers, printer, etc. coupled communicatively to the processor(s) 202 and the memory 204.

The memory 204 may store program instructions that are loadable and executable on the processor(s) 202, as well as data generated during execution of, and/or usable in conjunction with, these programs. In the illustrated example, memory 204 stores an operating system 212, which provides basic system functionality of the computing system 200 and, among other things, provides for operation of the other programs and modules of the computing system 200.

The memory 204 includes a micro-execution test engine 214, which may be the same as or similar to the micro-execution test engine 110. The micro-execution test engine 214 may be a modified runtime virtual machine that includes a tracker module 216 that is configured to track the execution of a code segment 218 of an executable program 220 that is under test. In the embodiments illustrated in FIG. 2, the executable program 220 is stored on the memory 204, and not as part of the micro-execution test engine 214. During micro-execution, as illustrated in FIG. 1, the code segment 218 of executable program 220 is executed within the environment of the micro-execution test engine 214, although a copy of the executable program 220 may remain stored within the memory 204. Thus, the different location of the executable programs 112 and 220 within FIGS. 1 and 2 is for the purpose of illustration only.

The memory 204 also includes the memory policy 222 and a map 224, which may be the same as or similar to the memory policy 116 and map 120, respectively. The memory 204 also includes a test output 226, which includes the output of the code segment 218 produced by the micro-execution of the code segment 218 within the micro-execution test engine 214. The test output 226 can be viewed by a user, or with a test output tool, to determine the behavior of the code segment 218.

Example Operations for Micro-Execution

Figure 3:
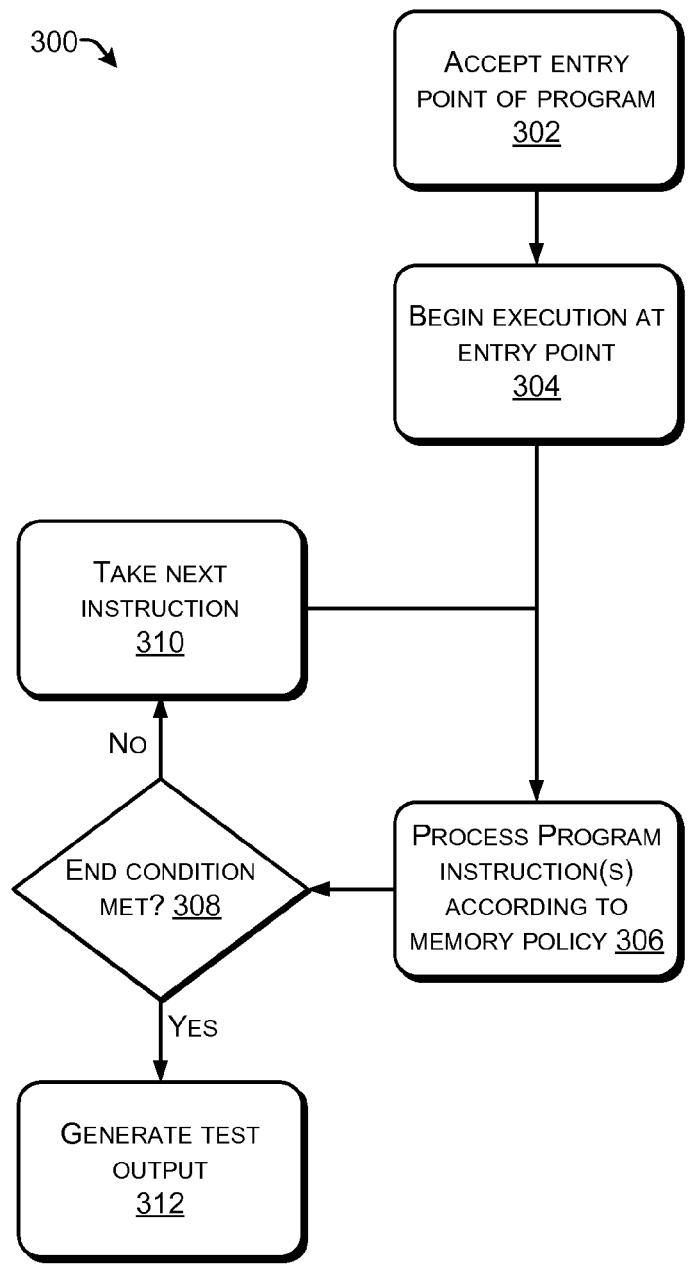
FIG. 3 is a flow diagram showing a process for micro-execution of a code segment.

FIG. 3 is a flow diagram showing a process 300 for micro-execution of a code segment. At 302, a micro-execution test engine, such as the micro-execution test engine 110 or 214, accepts an entry point of the code segment of an executable program to be tested. The entry point identifies the beginning of the executable code within the executable program where the beginning of the code segment resides. The entry point may be a dynamic link library (dll) exported code function or a pointer to a memory location where the code segment resides, or some other identifier that identifies the code segment. The entry point may be user-defined, or the entry point may be determined by a tool, such as an automated binary-analysis tool, that identifies code segments for micro-execution.

At 304, the micro-execution test engine begins execution of the code segment at the entry point. At 306, the micro-execution test engine processes the most recent instruction according to a memory policy, including decomposing the instruction as described above with respect to FIG. 1. Further details regarding the processing of the instruction are described in FIG. 4. During the processing of the instruction, the micro-execution test engine decomposes the instruction into micro instructions, traps any memory operations within the micro instructions, calculates their effective addresses, determines whether the memory operation is an input or output according to the memory policy, allocates replacement addresses for the inputs and outputs, generates inputs for any input memory operations according to the memory policy, and executes the micro instruction utilizing the replacement addresses and/or the input values generated according to the memory policy.

If an end condition is not met at 308 ("No"), the micro-execution test engine takes the next instruction at 310, and the process repeats until an end condition is met. However, if an end condition is met at 308 ("Yes"), test output is produced at 312 by the micro-execution test engine for analysis. And end condition may be user-defined, although there may be a default or automatically determined end condition. Example end conditions include the code segment is executed completely, the execution crashes, a certain number of instructions are executed, a certain amount of time has elapsed, the test output reaches a certain size, and so forth. Other end conditions may be used in accordance with various embodiments.

The process 300 shown in FIG. 3 may be repeated multiple times. For example, where random inputs are generated according to a memory policy, the code segment may be executed multiple times, so that different inputs for the instructions can be used to more thoroughly test the behavior of the code segment.

Figure 4:
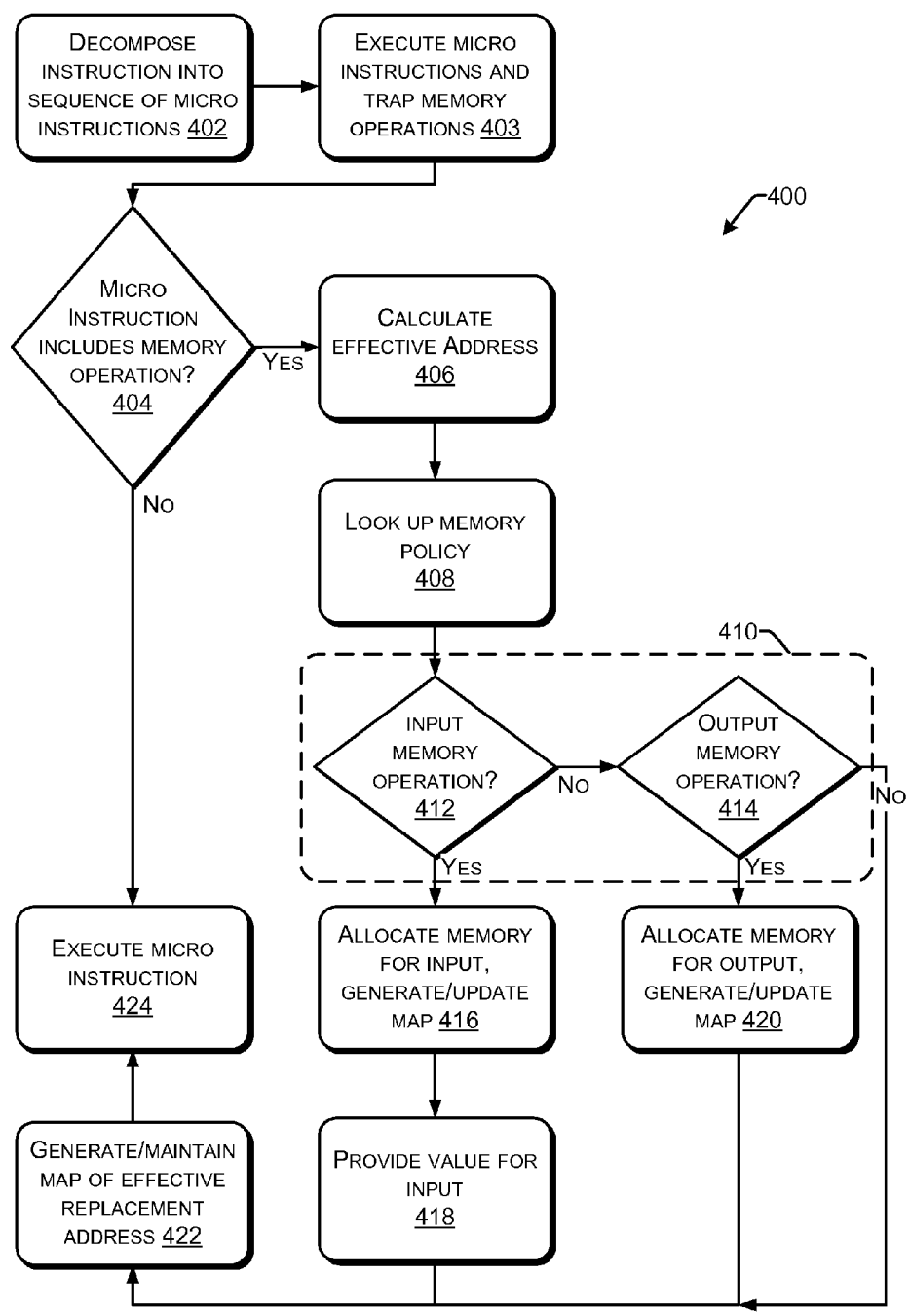
FIG. 4 is a flow diagram showing an example process for processing an instruction according to a memory policy.

FIG. 4 is a flow diagram showing an example process 400 for processing an instruction according to a memory policy. At 402, the micro-execution test engine decomposes the instruction into a sequence of micro-instructions, where a micro-instruction performs at most one memory operation that can either be a read operation (input) or a write operation (output). At 403, the micro-execution test engine executes this sequence of micro-instructions, including trapping any memory operations. If the micro-instruction includes a memory operation at 404 ("Yes"), then the micro-execution test engine calculates an effective address for the memory operation at 406.

At 408, a look-up to the memory policy is performed. At 410, the micro-execution test engine determines, prior to performing the memory operation, and based on the memory policy, that the effective address is to be replaced with a replacement address. As part of this process, at 412 the micro-execution test engine determines that the memory operation is an input memory operation in which a value stored at the effective address is input to the executable. And at 414, the micro-execution test engine determines that the memory operation is an output memory operation in which a value is output from the executable ("No").

Based on determining that the effective address is to be replaced, the micro-execution test engine allocates the replacement address. Thus, at 416, based on determining that the memory operation is an input memory operation ("Yes"), the micro-execution test engine allocates a replacement address for the memory operation. At 418, the micro-execution test engine provides an input value for the input according to the memory policy, including storing the provided input value at the replacement address. Example input generation strategies that may be employed by a memory policy include: the test input value is randomly generated or selected, the test input value is zero, the test input value is read from a file, the test input is generated by a tool, and so forth.

At 420, upon determining that the memory operation is an output ("Yes"), the micro-execution test engine allocates a replacement address for the memory operation.

At 422, the micro-execution test engine generates and/or maintains a map that includes a map entry showing a mapping between the effective address and the allocated replacement address.

At 424, the micro-execution test engine executes the micro-instruction. For example, where the memory operation is an input to the executable, the memory operation is performed using the allocated replacement address and the provided input value generated according to the memory policy, as opposed to performing the memory operation utilizing the effective address and executing the instruction using the value stored at the effective address. Where the memory operation is an output operation, the micro-execution test engine stores the value that is output from the instruction at the allocated replacement address. And where the memory operation is neither an input according to the memory policy, nor an output, the micro-execution test engine executes the micro-instruction, including performing the memory operation using the effective address (and not a replacement address). During execution of the instructions of the code segment, the micro-execution test engine hides the external memory from the code segment. For example, where the memory operation refers to a register that contains a pointer to an input, the register content is left unchanged by the allocation of the replacement address.

FIGS. 3 and 4 depict flow graphs that show example processes in accordance with various embodiments. The operations of these processes are illustrated in individual blocks and summarized with reference to those blocks. These processes are illustrated as logical flow graphs, each operation of which may represent a set of operations that can be implemented in hardware, software, or a combination thereof. In the context of software, the operations represent computer-executable instructions stored on one or more computer storage media that, when executed by one or more processors, enable the one or more processors to perform the recited operations. Generally, computer-executable instructions include routines, programs, objects, modules, components, data structures, and the like that perform particular functions or implement particular abstract data types. The order in which the operations are described is not intended to be construed as a limitation, and any number of the described operations can be combined in any order, separated into sub-operations, and/or performed in parallel to implement the process. Processes according to various embodiments of the present disclosure may include only some or all of the operations depicted in the logical flow graph.

Computer-Readable Media

Depending on the configuration and type of computing device used, memory 204 of the computing system 200 in FIG. 2 may include volatile memory (such as random access memory (RAM)) and/or non-volatile memory (such as read-only memory (ROM), flash memory, etc.). Memory 204 may also include additional removable storage and/or non-removable storage including, but not limited to, flash memory, magnetic storage, optical storage, and/or tape storage that may provide non-volatile storage of computer-readable instructions, data structures, program modules, and other data for computing system 200.

Memory 204 is an example of computer-readable media. Computer-readable media includes at least two types of computer-readable media, namely computer storage media and communications media.

Computer storage media includes volatile and non-volatile, removable and non-removable media implemented in any process or technology for storage of information such as computer-readable instructions, data structures, program modules, or other data. Computer storage media includes, but is not limited to, phase change memory (PRAM), static random-access memory (SRAM), dynamic random-access memory (DRAM), other types of random-access memory (RAM), read-only memory (ROM), electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic storage devices, or any other non-transmission medium that can be used to store information for access by a computing device.

In contrast, communication media may embody computer-readable instructions, data structures, program modules, or other data in a modulated data signal, such as a carrier wave, or other transmission mechanism. As defined herein, computer storage media does not include communication media.

CONCLUSION

Although the disclosure uses language that is specific to structural features and/or methodological acts, the invention is not limited to the specific features or acts described. Rather, the specific features and acts are disclosed as illustrative forms of implementing the invention.

What is claimed is:

1. A method comprising:
   halting, by a test environment implemented by a virtual machine, performance of a memory operation of an instruction of an executable;
   determining, by the test environment, an effective address of the memory operation, the effective address being a memory address of a memory;
   determining, by the test environment, prior to performing the memory operation and based at least in part on a memory policy that includes an indication of which memory operations are input memory operations, that the effective address is to be replaced with a replacement address that is another memory address of the memory;
   based at least in part on determining that the effective address is to be replaced, allocating, by the test environment, the replacement address; and executing, by the test environment, the instruction based on the allocated replacement address.

2. The method of claim 1, further comprising:
determining that the memory operation is an input memory operation in which a value stored at the effective address is input to the executable;
determining a test input value based on the memory policy; and
providing the test input value to the allocated replacement address,
wherein the executing the instruction based on the allocated replacement address includes executing the instruction using the test input value.

3. The method of claim 2, wherein the determining the test input value based on the memory policy includes at least one of:
randomly generating the test input value;
allocating zero for the test input value; or
reading the test input value from a file.

4. The method of claim 1, wherein the determining that the effective address is to be replaced with the replacement address, based on the memory policy, includes determining that the effective address is to be replaced based at least on the memory operation being an input memory operation that reads a value from an uninitialized function argument.

5. The method of claim 1, further comprising determining that the memory operation is an output memory operation in which a value is output from the executable, wherein the executing the instruction includes storing the value at the replacement address.

6. The method of claim 1, further comprising generating a map entry showing a mapping between the effective address and the replacement address.

7. The method of claim 1, wherein the memory operation refers to a register that contains a pointer to an input, and wherein register content of the register is left unchanged by the allocation of the replacement address.

8. The method of claim 1, further comprising receiving an entry point to the executable and beginning execution of the executable identified by the entry point.

9. The method of claim 1, further comprising identifying the memory operation prior to interrupting the performance of the memory operation.

10. The method of claim 1, further comprising decomposing instructions of the executable into micro instructions that individually include a memory operation, wherein the instruction of the executable is a micro instruction of the micro instructions.

11. One or more computer storage media including a plurality of instructions that are executable by one or more processors to:
implement a virtual machine, the virtual machine configured to implement a test environment to test a code segment of a program, wherein the test environment:
interrupts performance of a memory operation associated with a code segment;
calculates an effective address of the memory operation, the effective address being a memory address of a memory;
determines, prior to performing the memory operation and based at least in part on a memory policy that includes an indication of which memory operations are input memory operations, that the memory operation is an input memory operation in which a value stored at the effective address is input to the executable program;
allocate, based on the determination that the memory operation is an input memory operation according to the memory policy, a replacement address for the effective address, the replacement address being another memory address of the memory;
provides an input value for the input memory operation according to the memory policy; and
resumes performance of the memory operation in response to providing the input value.

12. The one or more computer storage media of claim 11, wherein the provision of the input value for the input memory operation, based on the memory policy, includes at least one of:
random generation of the test input value;
allocating zero as the test input value; or
reading the test input value from a file.

13. The one or more computer storage media of claim 11, wherein the determination, based on the memory policy, that the memory operation is an input memory operation includes determining that the memory operation reads a value from an uninitialized function argument.

14. The one or more computer storage media of claim 11, wherein the instructions are further executable to:
determine that a second memory operation of the code segment is an output memory operation in which a second value is output from a second effective address to the executing program; and
store the second value at a second allocated replacement address rather than at the second effective address.

15. The one or more computer storage media of claim 11, wherein the instructions are further executable to maintain a mapping of the effective address to the replacement address and directing subsequent memory operations for the effective address to the replacement address.

16. The one or more computer storage media of claim 11, wherein the instructions are further executable to begin executing the program at a user-identified entry point.

17. One or more computing systems, comprising:
one or more processors;
memory coupled to the one or more processors and including instructions that are executable by the one or more processors to implement a virtual machine, the virtual machine configured to implement a test environment to test a code segment of a program, wherein the test environment:
traps an input memory operation of an instruction of the code segment prior to performance of the input memory operation;
calculates an effective address of the input memory operation, the effective address being a memory address of the memory;
determines, prior to performance of the input memory operation and based at least partly on a memory policy, that the effective address is to be replaced by a replacement address that is another memory address of the memory;
allocates the replacement address;
provides a test input for the replacement address; and
performs the memory operation using the replacement address such that the test input is input into the program instead of a value stored at the effective address.

18. The one or more computing systems of claim 17, wherein the test environment further executes the instruction of the code segment using the test input.

19. The one or more computing systems of claim 17, wherein the determination, based at least partly on the memory policy, that the effective address is to be replaced by a replacement address includes determining that the input memory operation includes a reference to a value from an uninitialized function argument, plus a dereference to a previous input.

20. The one or more computing systems of claim 17, wherein the provision of a test input, based on the memory policy, includes one of:
  randomly generating the test input value;
  allocating zero for the test input value; or
  reading the test input value from a file.

\* \* \* \* \*